US00RE36279E

United States Patent [19]

Ujita

[11] E Patent Number: Re. 36,279

[45] Reissued Date of Patent: Aug. 24, 1999

[54] INK JET APPARATUS AND INK JET CARTRIDGE THEREFOR

[75] Inventor: Toshihiko Ujita, Yamato, Japan

[73] Assignee: Canon Kabushiki Kaisha, Tokyo, Japan

[21] Appl. No.: 08/832,187

[22] Filed: Apr. 8, 1997

Related U.S. Patent Documents

Reissue of:

[64] Patent No.: 5,138,344
Issued: Aug. 11, 1992
Appl. No.: 07/646,286
Filed: Jan. 28, 1991

U.S. Applications:

[63] Continuation of application No. 08/635,569, Apr. 22, 1996, abandoned, which is a continuation of application No. 08/288,262, Aug. 11, 1994, abandoned.

[30] Foreign Application Priority Data

Feb. 2, 1990 [JP] Japan ..... 2-022175

[51] Int. Cl.[6] ..... B41J 2/175

[52] U.S. Cl. ..... 347/86; 347/14

[58] Field of Search ..... 347/36, 49, 85–87

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,408,914 | 10/1983 | Ciesiel et al. | 400/208 |
| 4,419,678 | 12/1983 | Kasugayama et al. | 347/86 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,577,200 | 3/1986 | Rix et al. | 347/49 |
| 4,712,172 | 12/1987 | Kiyohara et al. | 347/60 |
| 4,723,129 | 2/1988 | Endo et al. | 347/56 |
| 4,740,796 | 4/1988 | Endo et al. | 347/56 |
| 4,872,027 | 10/1989 | Buskirk et al. | 347/49 X |
| 4,930,915 | 6/1990 | Kikuchi et al. | 400/175 |
| 5,113,206 | 5/1992 | Fukazawa | 347/86 |
| 5,506,611 | 4/1996 | Ujita et al. | 347/86 |

FOREIGN PATENT DOCUMENTS

| | | | |
|---|---|---|---|
| 3238063 | 4/1984 | Germany . | |
| 3405164 | 8/1985 | Germany | 347/86 |
| 54-56847 | 5/1979 | Japan . | |
| 54-6847 | 5/1979 | Japan . | |
| 60-1260 | 9/1983 | Japan . | |
| 59-38461 | 8/1984 | Japan . | |
| 59-123670 | 7/1984 | Japan . | |
| 59-138461 | 8/1984 | Japan . | |
| 0215870 | 12/1984 | Japan | 346/140 PD |
| 59-215870 | 12/1984 | Japan . | |
| 60-71260 | 4/1985 | Japan . | |
| 0192637 | 10/1985 | Japan | 346/140 PD |
| 60-192637 | 10/1985 | Japan . | |
| 62-184856 | 8/1987 | Japan . | |
| 2001911 | 1/1978 | United Kingdom . | |

OTHER PUBLICATIONS

Rezanka, et al., "Cap for Disposable Ink Jet Printhead Cartridge", Xerox Disclosure Journal, vol. 12, No. 1, Jan./Feb. 1987, pp. 19–20.

*Primary Examiner*—Joseph W. Hartary
*Attorney, Agent, or Firm*—Fitzpatrick, Cella, Harper & Scinto

[57] ABSTRACT

An ink cartridge detachably mountable to an ink jet recording apparatus, the ink cartridge containing ink to be supplied to a recording head includes an ink container for containing the ink; and an adaptor having a receptor for detachably receiving the ink container and an information medium for storing information relating to the ink, the information being transmitted to the ink jet recording apparatus when the ink cartridge is mounted therein.

13 Claims, 8 Drawing Sheets

INK JET APPARATUS AND INK JET CARTRIDGE THEREFOR

Matter enclosed in heavy brackets [ ] appears in the original patent but forms no part of this reissue specification; matter printed in italics indicates the additions made by reissue.

*This application is a continuation of application Ser. No. 08/635,569, filed Apr. 22, 1996, now abandoned, which is a continuation of application Ser. No. 08/288,262, filed Aug. 11, 1994, now abandoned, which is a reissue application of U.S. Pat. No. 5,138,344.*

FIELD OF THE INVENTION AND RELATED ART

The present invention relates to an ink jet apparatus and an ink jet cartridge usable for an office recorder such as copying machine, facsimile machine, word-processor and various printers and a dyeing machine wherein a desired image is formed on a material by ejection of ink, more particularly to an ink jet apparatus having a cartridge mounting portion for detachably accepting an ink jet cartridge for supplying the ink to a recording head, and to an ink jet cartridge therefor.

The ink jet recording apparatus is advantageous in that the noise during the recording operation is so small that it can be neglected, and in that the recording can be effected on plain printer, and therefore, various type are put into practice, recently. Among various types of ink jet recording process, a so-called bubble-jet recording method is particularly advantageous because it uses thermal energy as the energy for ejecting the ink. More particularly, the ink supplied with the thermal energy is subjected to the state change with the result of abrupt volume change (film boiling), by which the ink is ejected through an ejection outlet (discharging opening) at an end of the recording head to produce a flying droplet of the ink. The droplet is deposited on the recording material disposed faced to the head, so that a desired image can be formed.

FIGS. 1A and 1B show an example of such a recording head. In these Figures, reference numeral 101 designates an ink passage communicating with an ink ejection outlet 102; 103, a heat acting portion at which the thermal energy is supplied to the ink in the ink passage 101; 104, an electrothermal transducer formed at the heat acting portion 103; 105, an electrode for supplying the electric energy to the electrothermal transducer 104; 106, a heat generating resistor; 107, a protection layer for protecting the heat generating resistor layer 106 and the electrode 105 from the ink or from the cavitation. The protection layer 107 is also effective to prevent the electric leakage, the thermal oxidation, the corrosion by the cavitation resulting from the bubbles.

In such a recording head, when the electrothermal transducer 104 is supplied with the electric energy, the ink at the heat acting portion 103 receives the thermal energy (ink droplet forming energy) and is subjected to an abrupt volume increase (state change), more particularly, the ink at the heat acting portion 103 is instantaneously evaporated, thus producing a bubble. By the development of the bubble, the ink existing between the heat acting portion 103 and the ink ejection outlet 102 is ejected as a droplet of the ink. During the repetitive production and dissipation of the bubble, the ink is subjected to the high temperature, and therefore, ink material which is thermally instable is easily chemically changed. If this occurs, an insoluble material is precipitated, which may lead to the ink ejection failure of the recording head. In order to effect a recording operation in a long term at a high recording speed using such a recording head, it is very important to improve the stability of the ink, and the optimum driving conditions are selected to meet the property of the ink in the recording head.

FIG. 2 shows an example of the change with time of the surface temperature T of the heat acting surface 108 and the volume V of the produced bubble when the electrothermal transducer 104 of the recording head having the structure described above is supplied with the electric signal having the pulse-wave form as indicated by a reference character P. Assuming that electric signal P is supplied to the electrothermal transducer 104, the electric signal P being in the form of a pulse rising at time $t_0$ and time $t_p$, then the surface temperature T of the heat acting surface 108 reaches its maximum temperature Tp at the time $t_p$. If the maximum temperature Tp is higher than a boiling point Tb of the ink in contact with the heat acting surface 108, the bubble is formed at time $t_{b0}$ when T=Tb, at the heat acting portion 103 filled with the ink. With the elapse of time, the volume of the bubble increases, and the volume reaches its maximum volume $V_p$ at the time $t_p$.

When the electric signal P is shut off at the time $t_p$, the surface temperature T starts to decrease, and the volume V of the bubble also decreases. In order to stably eject the droplet of the ink in the ink jet recording apparatus, the ink jet recording apparatus has a programmed hardware or software to control the film boiling drive conditions such as the voltage, pulsewidth or frequency of the electric energy supplied to the electrothermal transducer and the control of a preliminary ejection for the practically stabilized recording operation, in accordance with the properties of the ink used in the ink jet recording apparatus. Therefore, if an ink material which is for another type of apparatus is used, the proper recording operation is not effected. In consideration of this, the configuration of the ink cartridge is so selected that it can be used only with the proper recording apparatus.

In the conventional ink jet recording apparatus, however, the ink can not be freely selected, and therefore, it is difficult to use the ink not proper for the ink jet recording apparatus. Even if better ink is developed in the feature, it is still not usable because the program in the apparatus is not always proper. In order to solve such problems, some proposals have been made. For example, there is a proposal that the user sets the hardware or the software in accordance with the material of the ink. This is good in that the control parameters of the ink jet recording apparatus can be finely selected in accordance with the material of the ink. However, there are a great number of parameters to be selected, and therefore, the selecting operation is cumbersome, in addition, if the setting is erroneous, the proper printing is not effected, or the recording head experiences the overload. Therefore, the reliability is not sufficient.

In another proposal, the ink cartridge is provided with information medium (a resistor element, magnetic medium, bar-code, IC or ROM, for example) bearing information relating to the control parameters for the ink jet recording apparatus, so that the ink jet recording apparatus can automatically select the proper parameters in accordance with the information. According to this proposal, the information peculiar to the ink contained in the ink cartridge is assuredly transmitted to the main assembly of the recording apparatus, and the proper recording operation is guaranteed, and therefore, it is very good. However, it requires that a relatively expensive information medium such as a semiconductor memory means be provided for each of the cartridges, resulting in the increase of the cost of the ink cartridge. Furthermore, in order to permit the information to be read from the information medium into the ink jet recording head, a number of connections (for example, ROM) which are required to be correctly connected with the corresponding electrodes in the main assembly. Therefore, the mechanical accuracy has to be enhanced in the relative positional relations between the main assembly of the apparatus and the ink jet cartridge.

SUMMARY OF THE INVENTION

Accordingly, it is a principal object of the present invention to provide an improved structure for the transmission of the information from the ink cartridge to the main assembly of the recording apparatus.

It is another object of the present invention to provide an ink jet recording apparatus and an ink jet cartridge wherein the control parameters of the ink jet recording apparatus can be correctly and easily changed in accordance with the material of the ink contained.

It is a further object of the present invention to provide an ink jet recording apparatus and an ink cartridge structure wherein the high quality recording operation is possible with an increased reliability.

According to an aspect of the present invention, there is provided an ink cartridge detachably mountable to an ink jet recording apparatus, said ink cartridge containing ink to be supplied to a recording head, comprising: an ink container for containing the ink; and an adapter having a receptor for detachably receiving said ink container and an information medium for storing information relating to the ink, the information being transmitted to said ink jet recording apparatus when said ink cartridge is mounted therein.

According to another aspect of the present invention, there is provided an ink jet apparatus, comprising: an ink supply system for supplying ink from an ink cartridge containing the ink to be supplied to a recording head to the recording head; a recovery system for maintaining and recovering ink ejection from the recording head; a receptor to which the ink jet cartridge is detachably mountable; wherein said receptor is provided with a contact for electric contact with an information medium of the ink cartridge to read the information, wherein the ink cartridge comprises an ink container containing the ink and an adapter having a receptor for the ink container and the information medium bearing the information relating to the ink.

According to an aspect of the present invention, only an ink cassette is taken out of the ink cartridge after the ink is used up, and is exchanged with a fresh one, leaving an adapter having the information medium bearing the information representative of the property of the ink in the ink cassette. Therefore, the adapter can be continued to be used.

The ink cassette and the adapter so related, that only the proper ink cassette can be set in the adapter. Therefore, the information relating to the ink is correctly and assuredly transmitted to the recording apparatus. Therefore, even if the ink cartridge in which the ink cassette is exchanged, the recording head can be property driven in accordance with the property of the ink in the exchanged ink cassette.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring to the accompanying drawings, the embodiments of the present invention will be described in detail.

Figure 1B:
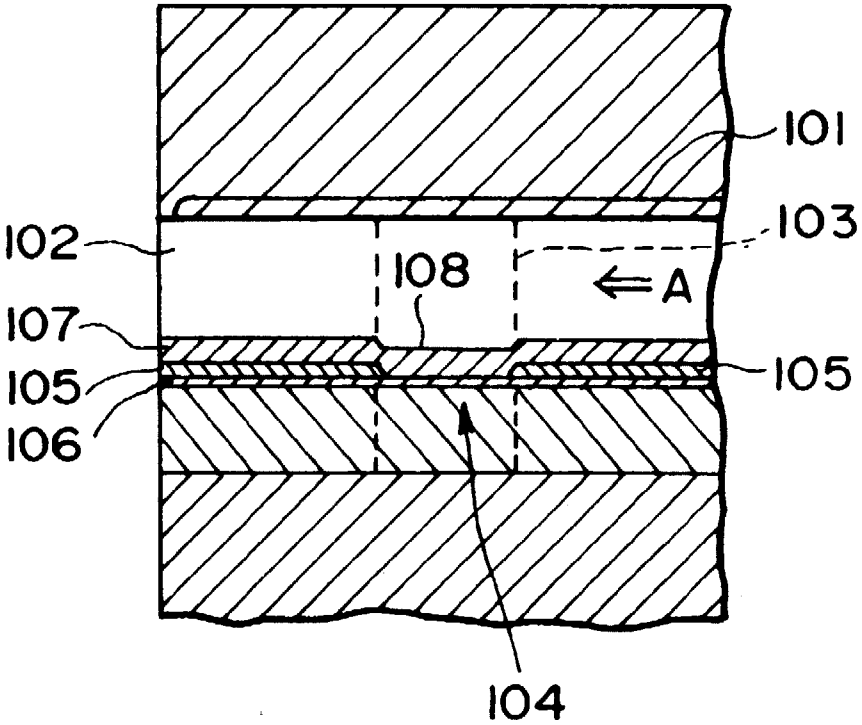
FIG. 1B PRIOR ART
FIGS. 1A and 1B are a sectional view of a recording head of a bubble jet type.
Figure 1A:
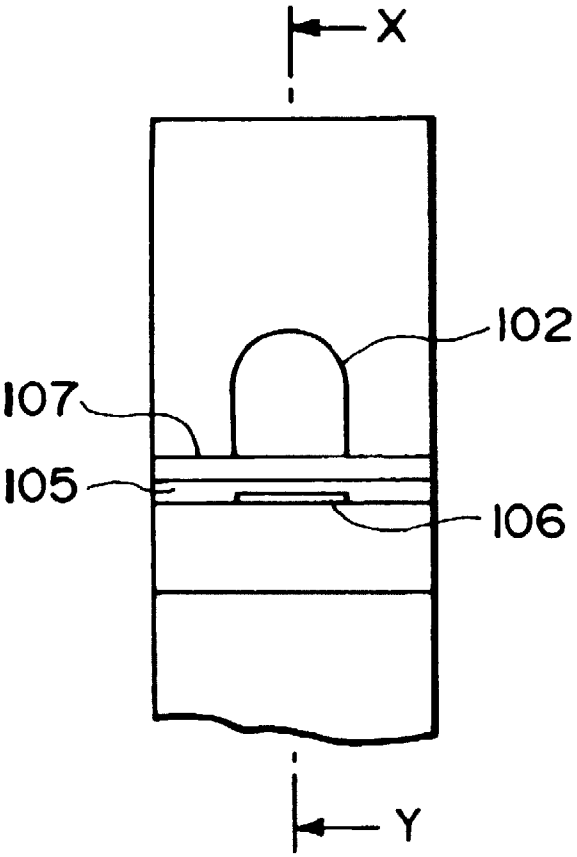
FIG. 1A PRIOR ART
Figure 2:
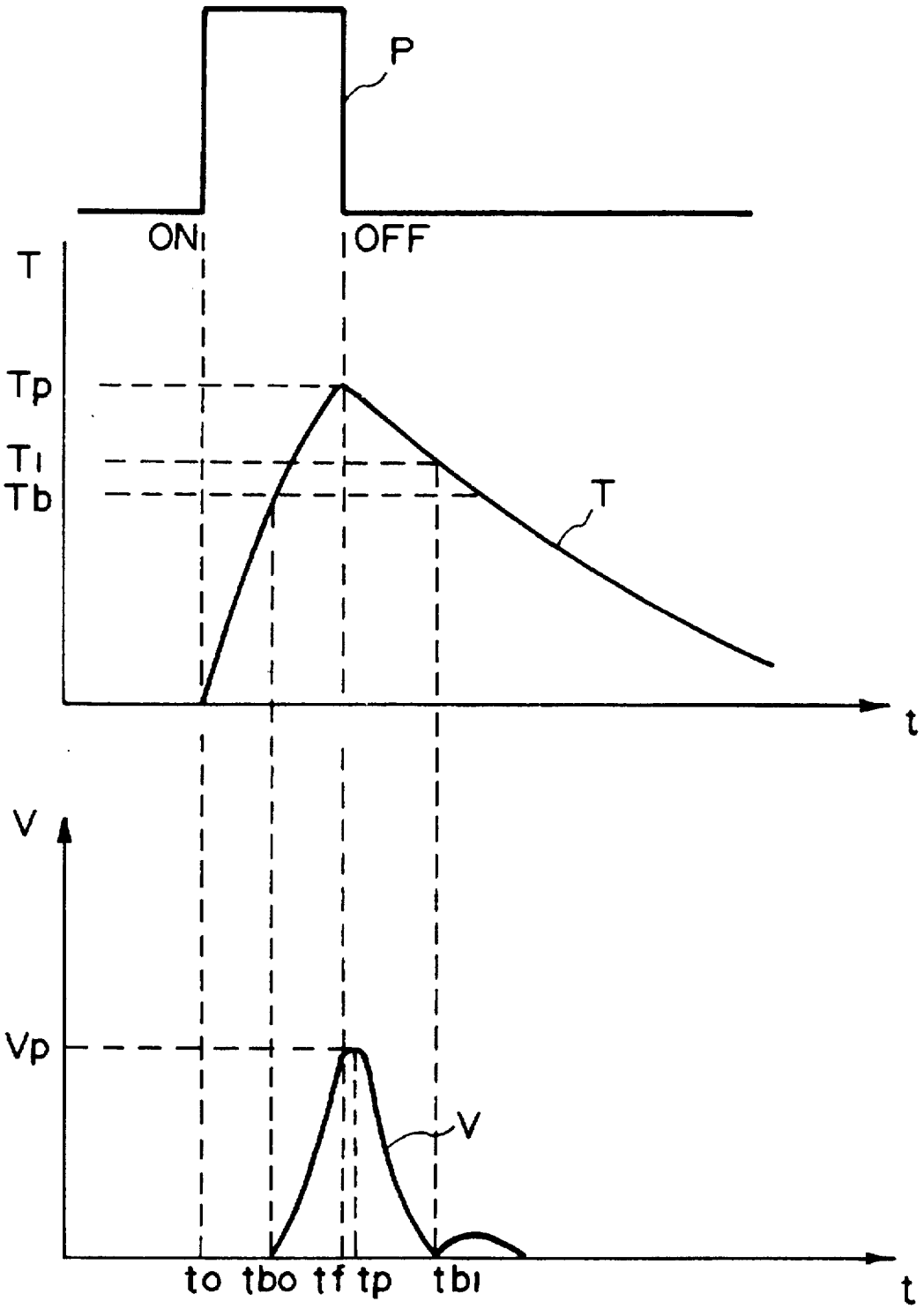
FIG. 2 is a graph of changes with time of the surface temperature of the heat acting surface and a volume of a produced bubble when a pulse electric signal is supplied to an electrothermal transducer of the recording head.
Figure 3:
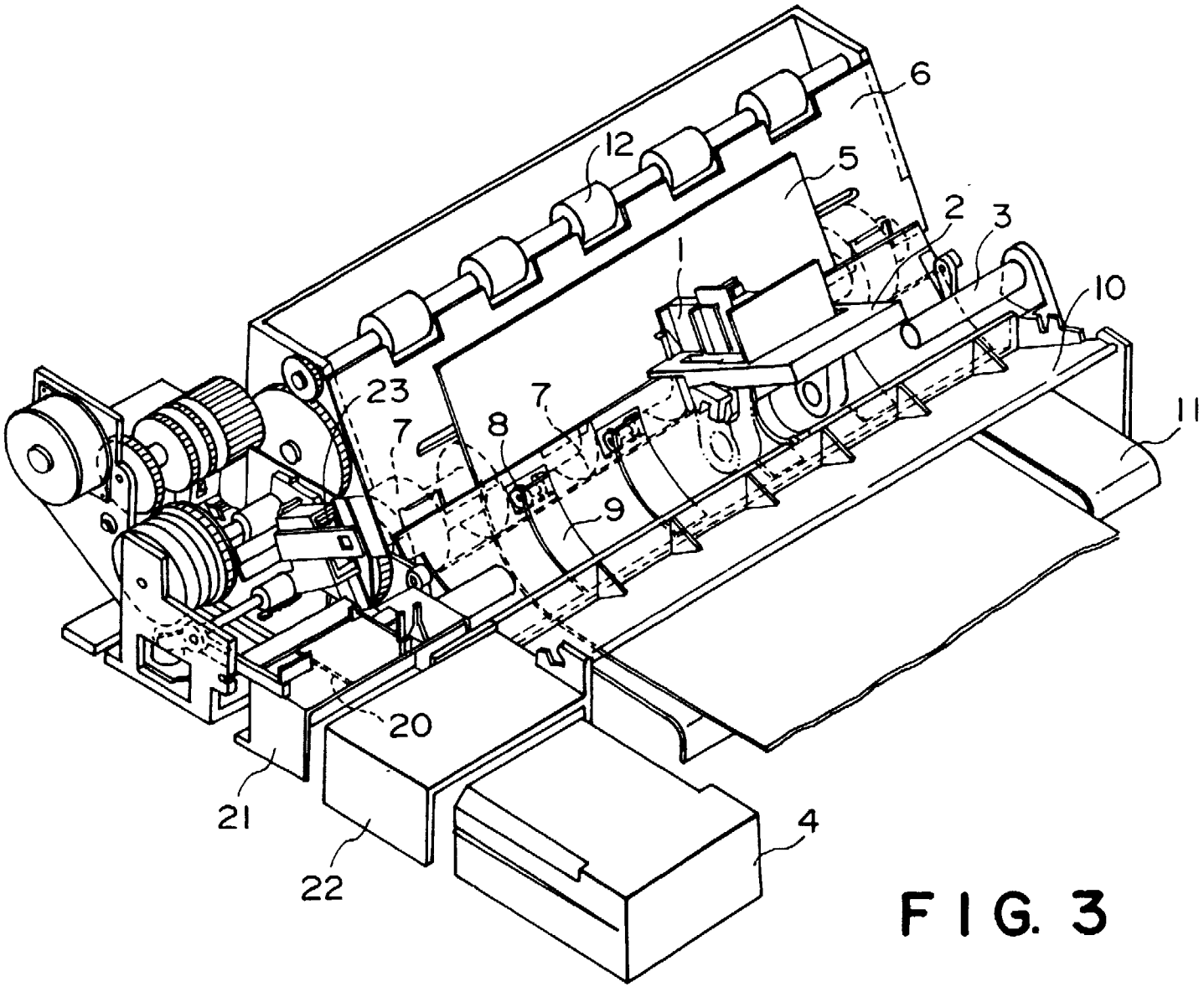
FIG. 3 is a perspective view of an example of an ink jet recording apparatus to which the present invention is applicable.

Referring to FIG. 3, there is shown an example of an ink jet recording apparatus to which the present invention is applicable. It comprises a recording head 1 carried on a carriage 2. The carriage 2 is driven by an unshown carriage driving motor through a timing belt stretched in conjunction with an idler pulley not shown. The carriage 2 reciprocates along a guide shaft 3 by rotation of the motor in the opposite directions. To the recording head 1, the ink is supplied from the ink cartridge 4 through an unshown ink tube, and during the movement of the carriage 2 from the left to the right, the ink is ejected to a recording material 5 in the form of a recording sheet, for example, which is fed to be faced to the ink jet ejection outlet (not shown). During the relative movement between the scanning recording head and the recording material, a desired image is formed.

The apparatus further comprises a fixed platen 6 in the form of a plate for supporting the recording sheet 5 in faced relation with the recording head 1 with a predetermined clearance therebetween, a feeding roller 7 for feeding the recording sheet 5, a pinch roller 8 in press-contact with the feeding roller 7 to nip the recording sheet 5 therebetween, a pinch roller holder 9 for applying the urging force to the pinch roller 7. The holder 7 is made of stainless steel plate or the like, and the resilient force deflects the pinch roller 7 toward the feeding roller 7. Upper and lower guides 10 and 11 are effective to retain the recording sheet 5 which is manually fed, for example and to feed it to between the feeding roller 7 and the pinch roller 8.

The recording sheet 5 supplied by the feeding roller 7 and the pinch roller 8 is nipped between a discharging roller 12 and a spur not shown press-contacted thereto after it is subjected to the recording operation by the recording head 1. In the left part of FIG. 3, there is shown a hollow needle 20 with which the ink cartridge 4 is pierced when the ink cartridge 4 is inserted through the cartridge inlet 21 along the cartridge guide 22. Through the hollow needle 20 and an unshown tube, the ink is supplied to the recording head 1.

A recovery means 23 effects cleaning, capping and recovery operations when the recording head 1 is moved to an initial position (non-recording position) during interruption or rest period of the recording head 1.

Figure 4:
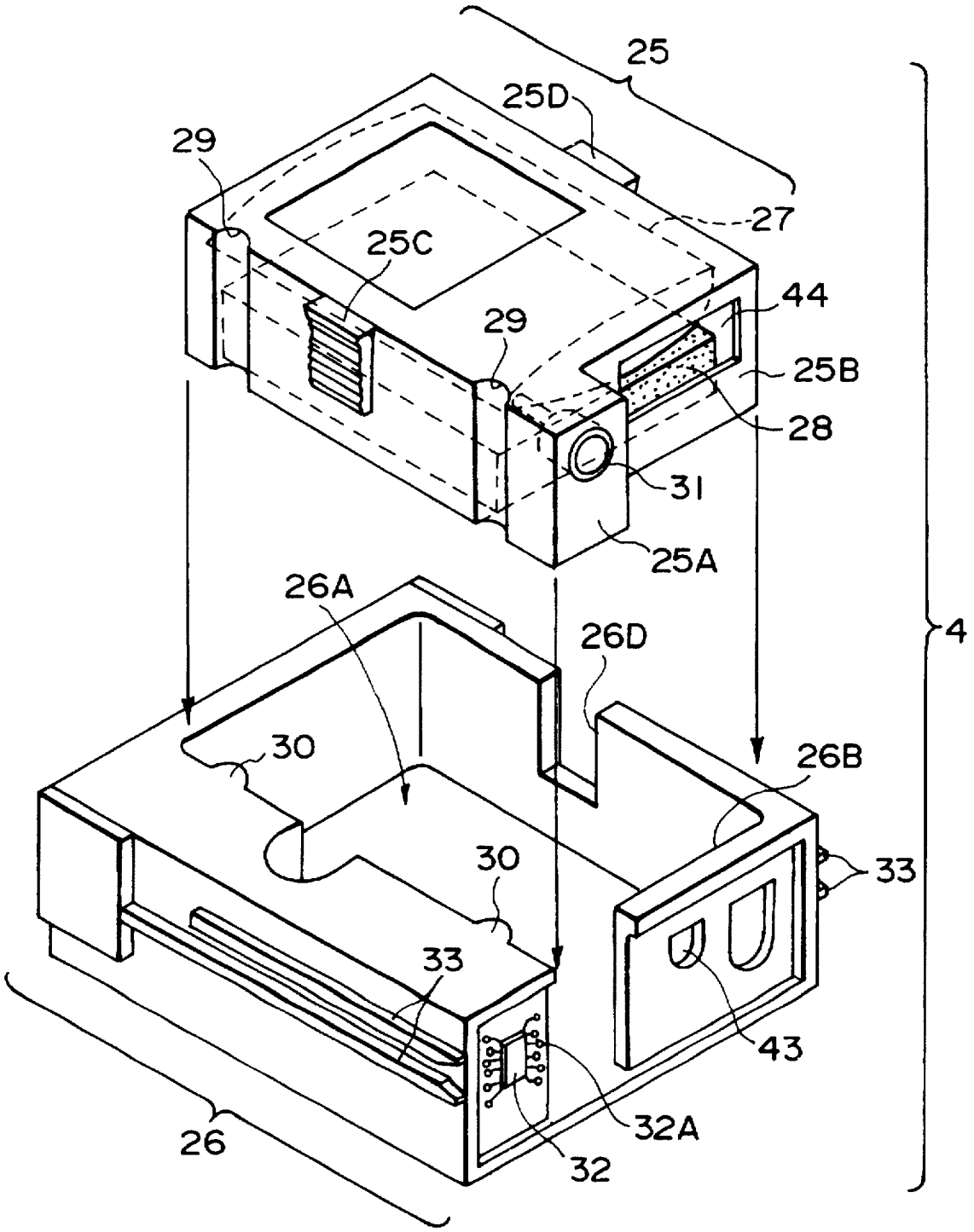
FIG. 4 is a perspective view of an example of an ink cassette and adapter structure according to an embodiment of the present invention.

Referring to FIG. 4, the description will be made as to the structure of the ink cartridge 4. The ink cartridge 4 comprises an ink container for containing the ink used for the recording and having an ink absorbing material 28 for retaining the ejected ink, an ink cassette 25, and an adapter 26 to which the ink cassette 25 is detachably mounted. The ink cassette 25 has an ink bag 27 for containing the ink to be supplied to the recording head and an ink absorbing material 28 for retaining residual ink which has been ejected by idle ejection (preliminary ejection) due to the recovery operation for maintaining and recovering the correct ink ejection through the recording head. The outer casing of the ink cassette 25 is made of molded plastic material into an outer size or an outer configuration adapted to the size and the configuration of the ink cassette receptor 26A of the adapter 26. The outer casing of the ink cassette 25 may be made of metal or hard paper, if it is to properly retain the content.

In this embodiment, a recess 29 is formed at a predetermined position in an outer surface of the ink cassette 25. Correspondingly, the internal surface of the ink cassette receptor 26A of the adapter 26 is formed into a projection fitting the configuration of the recess 29. Therefore, only when the size and the configuration of the recess 29 and the projection are met, the ink cassette 25 can be mounted to the adapter 26. The adapter 26 is made of plastic mold or metal with high precision. As shown in the Figure, the ink cassette 25 can be fitted in the direction of the arrow into the ink cassette receptor.

The flexible ink bag 27 accommodated in the ink cassette 25 is connected through a tube or the like with a capping member 31 made of elastic material such as silicone rubber which can be pierced with the hollow needle 20 for the supply of the ink upon the mounting of the ink cartridge 4 on the recording apparatus. An information medium 32 is supported on that side of the adapter 26 which is for the connection with the apparatus. The recording medium is capable of electrically or electronically storing the information. It may be in the form of a ROM, an electrically erasable ROM, a resistor, a capacitor, a battery, a battery backed-up RAM, logic circuit or the like.

The information medium may store physical memory, for example, by providing a particular configuration to the adapter 26, by different optical reflecting or transparent properties, by magnetic recording. In these cases, the ink jet recording apparatus is provided with an information reading means corresponding thereto.

The information medium 32 bears information necessary for the control for the main assembly of the ink jet recording apparatus in accordance with the material of the ink accommodated in the ink cassette 25. Designated by a reference 32A is a contact of the information medium 32 to establish the electric connection between the information medium 32 and the main assembly of the ink jet recording apparatus. The contact 32A has contact elements disposed at a high density, and therefore, it can be accommodated in a small area. A rail 33 is formed at each side of the adapter 26. When the ink cartridge 4 is inserted through the insertion inlet 21 along the cartridge guide 22, the rails 33 are engaged with unshown guiding grooves, by which the ink cartridge 4 is correctly positioned, and in addition, the correct relative position between the information medium and the leading means is assured.

In addition, in this embodiment, the capping member 31 of the ink cassette 25 which is connected with the supplying hollow needle 20 is in the form of a projection, and when the ink cassette 25 is mounted in the adapter 26, the wall surface 25A of the portion constitutes a side wall of the adapter.

Adjacent the capping member 31, there is an opening 44 to accept a residual ink tube 42 of the apparatus for the ink absorbing material 28 for absorbing the residual ink. The opening 44 is overlapped with a residual ink recepting opening 43 of the adapter 26 when the ink cassette 25 is mounted in the adapter 26.

The opening 44 may be formed so as to be larger than the opening 43, as shown in FIG. 4. It may have the same size and configuration as the opening 43, if it can properly receive the residual ink.

A fixed or replaceable absorbing material may be provided at the regions adjacent the front surface 25b of the ink cassette 25 and the inside surface 26b of the adapter 26 for receiving the residual ink, in order to prevent the leakage of the residual ink.

In addition, the opening 44 may be provided with a film or a sheet-like covering member which may be broken by a tube 42 when the ink cartridge is mounted to the assembly. By doing so, the residual ink may be discharged. The covering member may be provided with a slit at a position where the tube is inserted. The provision of the covering member is effective to prevent the scattering of the residual ink when the residual ink flows and the falling of the residual ink from the residual ink absorbing material upon the exchange of the ink cassette after the use-up thereof.

In the ink cartridge 4 described in the foregoing, the fitting between the recess 29 of the ink cassette and the projection 30 of the adapter 26 is predetermined in accordance with the material of the ink contained in the ink cassette 25. The information medium 32 of the adapter 26 bears information for the controlling operation of the main assembly of the recording apparatus suitable for the material of the ink contained in the ink cassette 25. Therefore, the ink cassette 25 of one kind is usable only with the adapter 26 having the information medium 32 corresponding to the control information suitable for the material of the ink contained in the cassette.

By using the two part structure including the ink cassette containing the ink and the adapter for accommodating the cassette, the operator is required only to set a fresh ink cassette into the adapter after the ink is used up. The adapter is reusable so that the running cost can be reduced. Since the information medium for transmitting the information is not exchanged, therefore, the accuracy in the connection with the main assembly can be sufficiently maintained.

Figure 5:
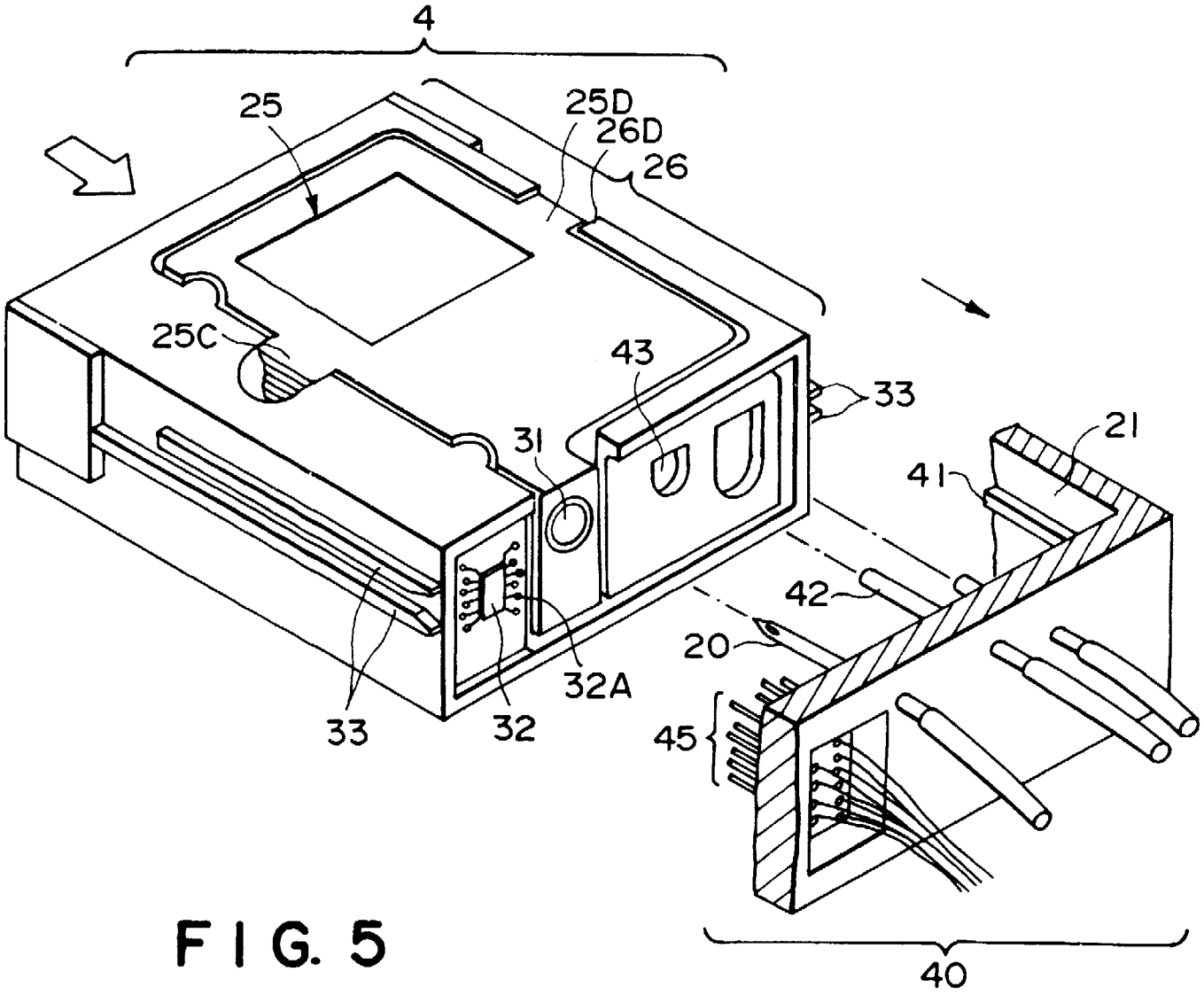
FIG. 5 illustrates the mounting of the ink jet cartridge having the ink cassette and the adapter into the ink jet recording apparatus.

FIG. 5 shows the state wherein the ink cartridge 4 including the ink cassette 25 and the adapter 26 is mounted in the ink cartridge receptor of the ink jet recording apparatus of FIG. 4. Here, the precise engagement is established between the rails 33 of the adapter 26 and the guides 41 in the cartridge inserting inlet 21 of the ink jet recording apparatus, and when the ink cartridge 4 is inserted in the direction of the arrow, the capping member 31 is pierced with the hollow ink needle 20 disposed at the receptor 40 of the ink jet recording apparatus, so that the ink in the ink bag 27 can be supplied to the ink jet recording apparatus.

The ink forcedly ejected from the ink jet recording head 1 by the ink refilling operation, flows through a tube 42 of the main assembly of the recording apparatus and is absorbed by the residual ink absorbing material 28 through the openings 43 and 44. When the ink cartridge 4 is completely mounted in the cartridge receptor 40, the electric connection is established between the contacts 32A and the corresponding connecting pins 45 electrically connected with the controller of the ink jet recording apparatus, which will be described hereinafter, so that the controlling information stored in the information medium 32 can be accessed by the CPU of the main assembly of the ink jet recording apparatus.

The ink cassette 25 is provided with serrations 25C and 25D for facilitating mounting and dismounting thereof relative to the adapter 26 in addition to the recess 29 for the engagement with the adapter 26. The serrations 25C and 25D are provided at the respective sides of the ink cassette 25. The serrations 25C and 25D, in this embodiment, also function to confine the engaging relation with the adapter 26. They are engaged with engaging portions 26D which is in the form of a cut-away portions at a side of the adapter 26.

The serrations 25D may have recess and projections which are the same as those of the rails 33 to constitute a part of the rail 33 used when the mounting or dismounting.

The serrations 25D may be projected from the side surface of the adapter 26 when the ink cassette 25 is mounted in the adapter 26. If this is done the serrations 25D is abutted to a guide 41 of the main assembly of the recording apparatus, so that they function as an insertion position limiting member of the entire ink cartridge 4.

When this structure is used, it may be made peculiar to the ink cassette so the positional relation between the hollow needle 20 and the ink bag can be assured. Therefore, in the case of color recording, the insertion length of the hollow needle 20 into the ink bag and the length relation between the guide 41 and the stopper 25D, can be made peculiar to the individual color ink, by which the erroneous insertion can be prevented, or the hollow needle is prevented, upon erroneous insertion, from reaching the ink bag.

Figure 6:
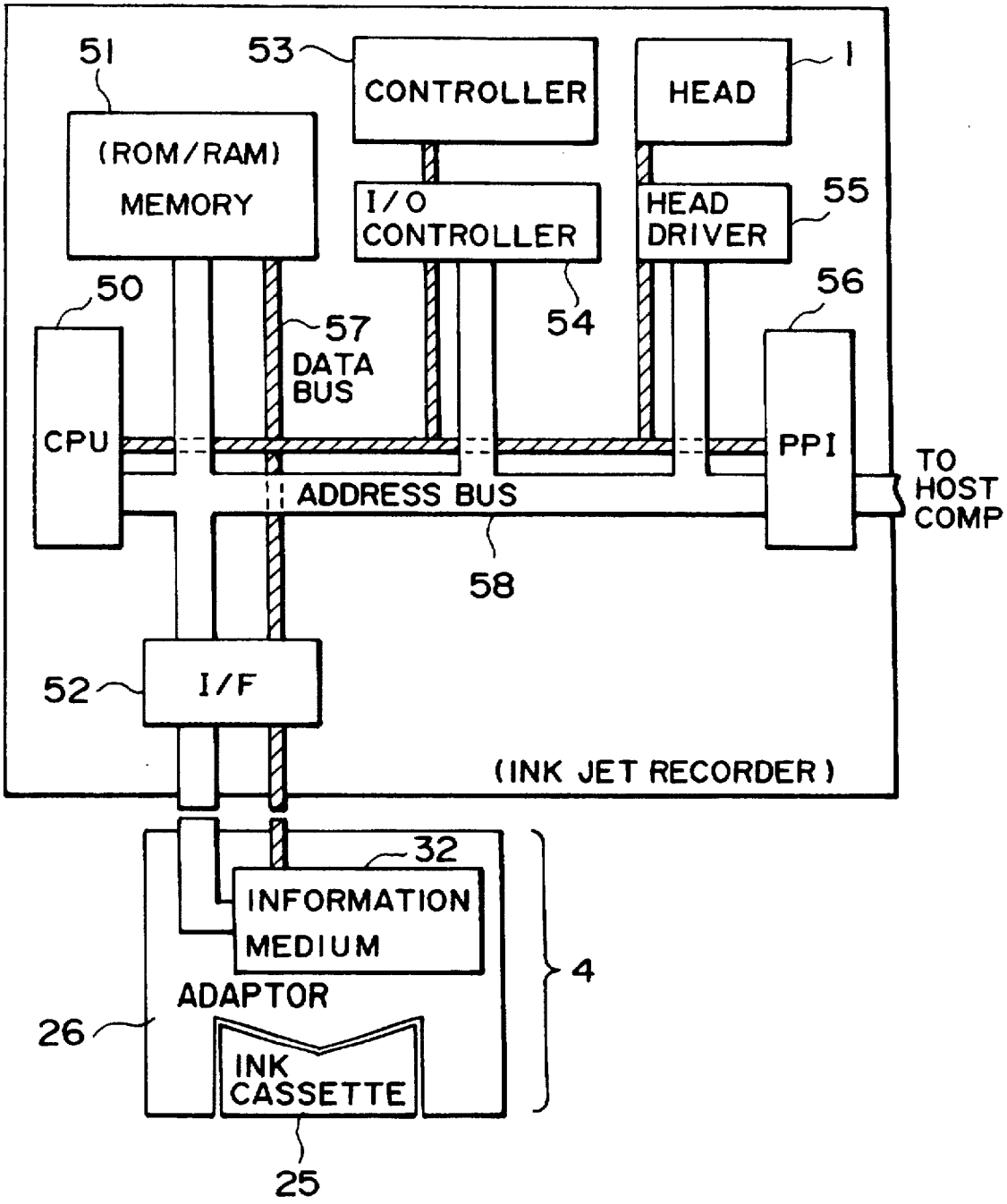
FIG. 6 is a block diagram of an electric circuit in the apparatus according to an embodiment of the present invention.

FIG. 6 shows the control system of the ink jet recording apparatus in connection with the ink cartridge 4. A central processing unit (CPU) 50, and memory in the form of ROM or RAM 51 are provided. When the main switch of the recording apparatus is actuated with the connection therebetween established, the data in the information medium 32 are read through an interface 52 into the memory 51 in accordance with the steps which will be described hereinafter. The recording apparatus comprises a controller 53, input and output controller 54, a head driver 55, a peripheral programmable interface (PPI) for a host computer, a data bus 57 and an address bus 58.

Figure 7:
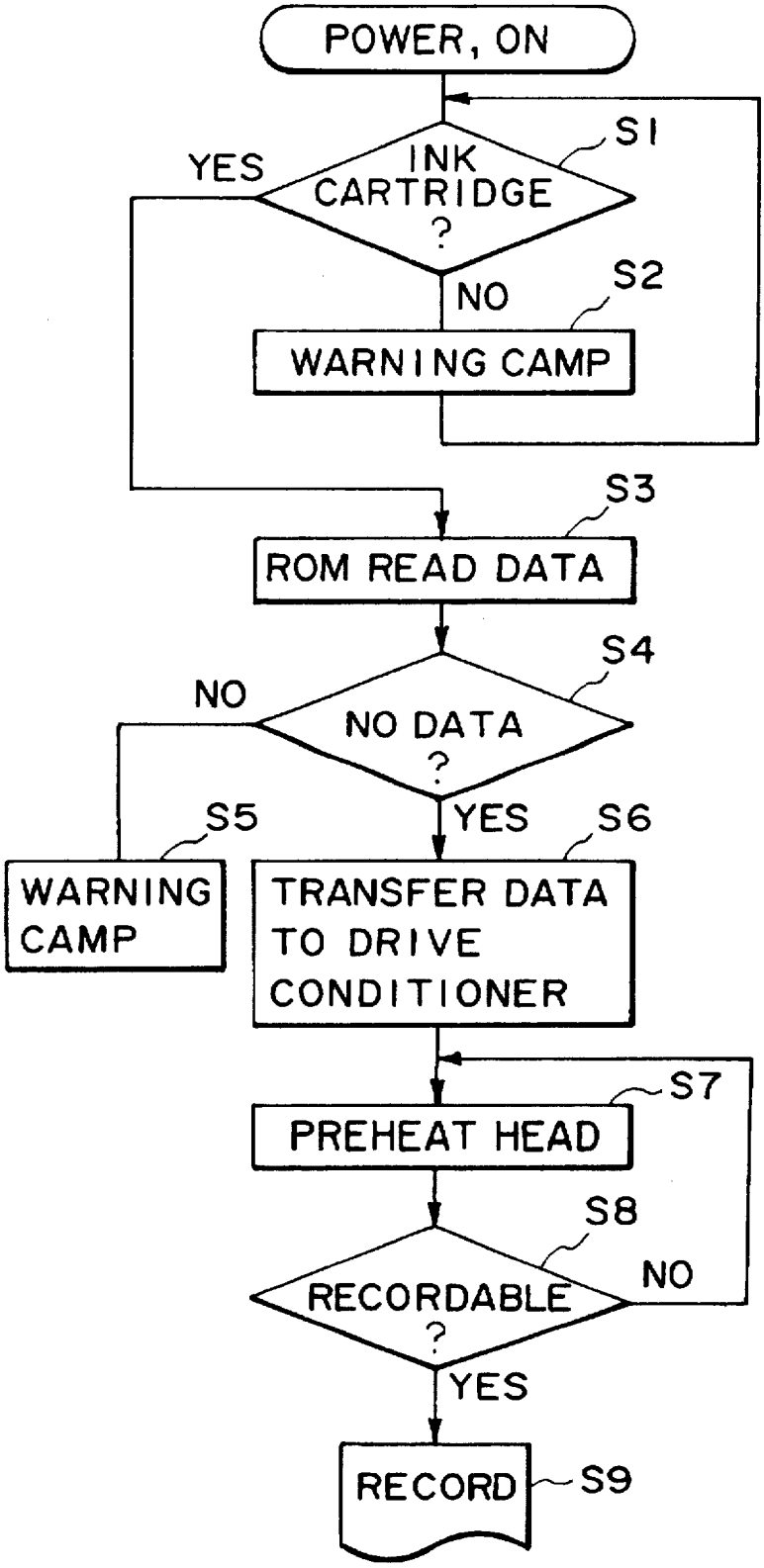
FIG. 7 is a flow chart of sequential operations after the main switch is actuated and until the recording operation is effected.

Referring to FIG. 7, the description will be made as to the control steps until the start of the recording operation when the ink cartridge 4 is mounted.

Upon the actuation of the main switch, the discrimination is made as to whether or not the ink cartridge is mounted, at step S1. If not, a warning is produced at step S2. If it is mounted, the operation proceeds to step S3 wherein the data is read from the ROM of the memory 51. The discrimination is made as to whether or not there is data, at step S4. If not, step S5 is executed by which a warning lamp is actuated. If so, the operation proceeds to step S6 wherein the driving parameters stored in the information medium 32 are transferred to the RAM of the memory 51. Then, on the basis of the data transferred, the recording head is preliminary heated in accordance with the conditions set in accordance with the driving parameters, at step S7. The discrimination is made at step S8 whether or not the recording operation is possible. If so, the sequential operation for the recording operation is effected at step S9.

Figure 8:
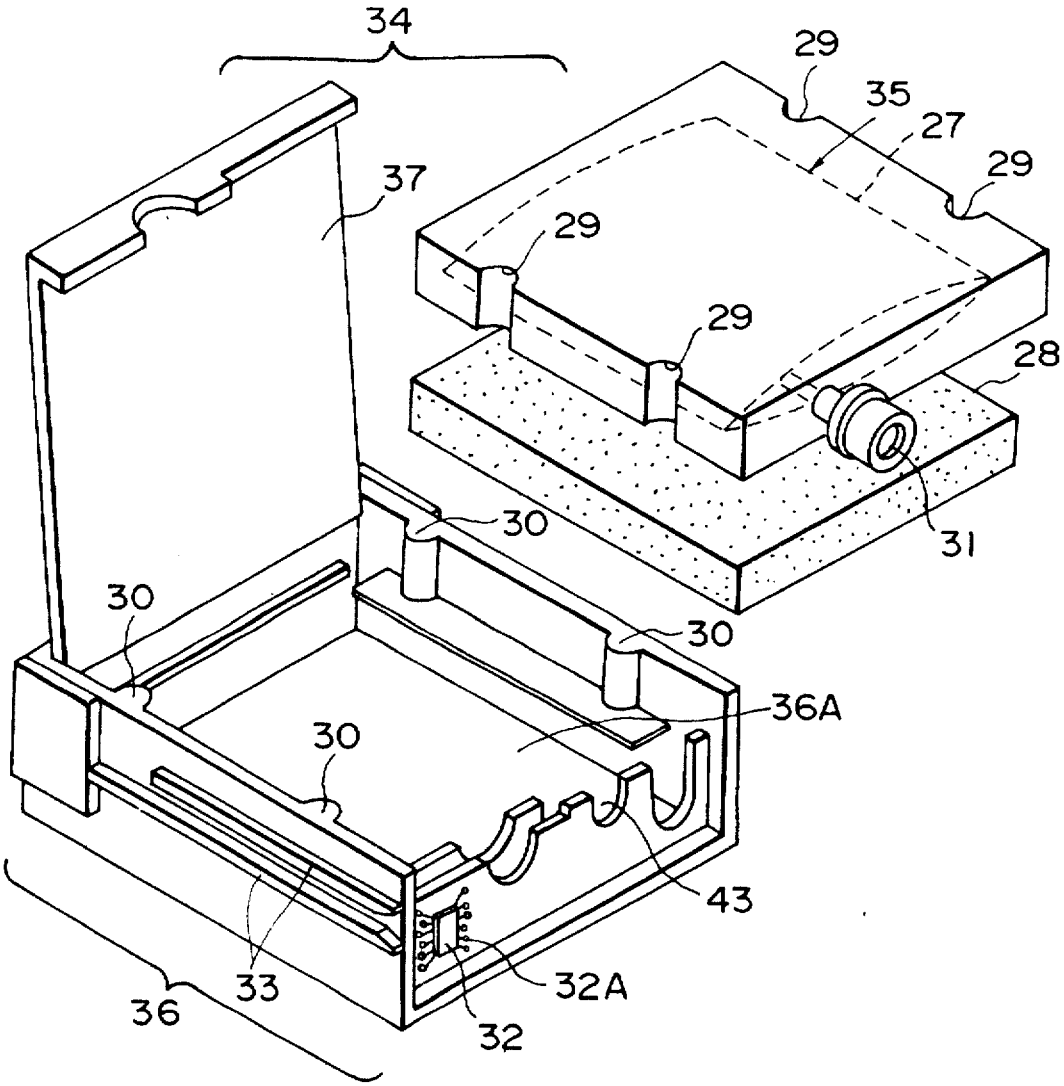
FIG. 8 is a perspective view of an ink cartridge according to another embodiment of the present invention.

FIG. 8 shows a structure of an ink cartridge 34 according to another embodiment of the present invention. It comprises an ink cassette 35, an adapter 36 and an ink cassette 35 which has only an ink absorbing material 28 and an ink bag 27. They are accommodated in the order named. When the ink absorbing material 28 and the ink cassette 35 are accommodated in the receptor 36A, they can be accepted only when the recess 29 of the ink cassette 35 is matched with the engaging projection 36 of the receptor 36A. When a top cover 37 of the adapter is closed, an ink cartridge 34 in the form of a unit is established. The top cover 37 is cut into a configuration matching the configuration of the capping member 31 of the bag 27. If the configurations do not match, the top cover 37 can not be closed. If this is done, the erroneous insertion of the ink cassette 35 can be further prevented.

In this embodiment, the information medium 32 of the adapter 36 bears controlling information corresponding to the material of the ink in the ink cassette 35, similarly to the foregoing embodiment.

According to this embodiment, the ink cassette 35 and the residual ink absorbing material 28 can be separately exchanged, and therefore, either of them can be exchanged when it becomes out of use. In any embodiments, the information medium 32 is provided. The adapter which is relatively more expensive than the ink cassette can be continued to be used even if the ink cassette is exchanged for replenishing the ink. Therefore, the running cost of the recording apparatus can be reduced.

In addition, the information medium is not exchanged even if the ink is used up, and therefore the connection with the main assembly is maintained correct.

The residual ink absorbing material 28 is sealed to prevent the leakage of the ink to the outside of the adapter 36 constituting the ink cartridge 34.

The outer periphery of the ink absorbing material 28 may be covered with a film or sheet material to provide the sealing. If this is done, the operator's hand will not be contaminated upon exchange of the absorbing material 28. Alternatively or in addition, the adapter may be provided with a partition member for isolating the ink cassette 35 and the residual ink absorbing material 28. By doing so, the sealing can be assured, and the ink cassette 35 may be prevented from being contaminated with the residual ink.

The present invention is particularly suitably usable in a bubble jet recording head and recording apparatus developed by Canon Kabushiki Kaisha, Japan. This is because, the high density of the picture element, and the high resolution of the recording are possible.

The typical structure and the operational principle are preferably the ones disclosed in U.S. Pat Nos. 4,723,129 and 4,740,796. The principle is applicable to a so-called on-demand type recording system and a continuous type recording system particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provide by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and a plural recording head combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefore, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single corresponding to a single color ink, or may be plural corresponding to the plurality of ink materials having different recording color or density. The present invention is effectively applicable to an apparatus having at least one of a monochromatic mode mainly with black and a multi-color with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

As described in the foregoing, according to the present invention, the ink jet recording apparatus can be provided which can effect assuredly its recording operation in accordance with the nature of the ink used. After the ink is used up, the information transmitting medium can be reused since only the ink cassette is exchanged. Therefore, the running cost is reduced, and the information transmitting medium is maintained at a correct position.

If the ink cartridge has two portions including the ink cassette containing the ink used for the recording and an adapter provided with medium bearing the information relating to the ink, the adapter is capable of detachably accepting the ink cassette. When the ink is used up, only the ink cassette is attended to, so that the running cost is reduced, and the contact between the information medium and the main assembly of the recording apparatus can be assuredly maintained with high precision.

While the invention has been described with reference to the structures disclosed herein, it is not confined to the details set forth and this application is intended to cover such modifications or changes as may come within the purposes of the improvements or the scope of the following claims.

What is claimed is:

1. An ink cartridge detachably mountable to an ink jet recording apparatus, said ink cartridge containing ink to be supplied to a recording head, comprising:

an ink cassette for containing said ink, said ink cassette being provided with a portion for preventing erroneous mounting; and an [adaptor] *adapter* having a receptor for detachably receiving said ink cassette and an information medium for storing information relating to said ink, said information being transmitted to said ink jet recording apparatus when said ink cartridge is mounted therein, said receptor having a portion corresponding to said portion for preventing erroneous mounting.

2. [An apparatus] *A cartridge* according to claim 1, wherein said ink cassette has an integral ink absorbing material for accommodating residual ink ejected to maintain and recover ink ejection from said recording head, said absorbing material being mounted to said adapter together with said ink cassette.

3. [An apparatus] *A cartridge* according to claim 2, wherein said adapter has a partition member between said ink cassette and a portion for accommodating said ink absorbing material.

4. [An apparatus] *A cartridge* according to claim 1, wherein a side wall of said cassette is provided with a grip projection for facilitating mounting and dismounting thereof relative to said ink cartridge, and wherein the projection also functions as a guiding rail for mounting of said ink cartridge.

5. [An apparatus] *A cartridge* according to claim 1, wherein the information medium bears information relating to a driving condition of said recording head.

6. An ink cartridge according to claim 1, wherein said adapter has a guiding portion at each side for guiding said ink cartridge when said cartridge is mounted to said ink jet apparatus.

7. An ink jet apparatus, comprising:

an ink supply system for supplying ink from an ink cartridge containing said ink to be supplied to a recording head;

wherein said ink cartridge comprises an ink cassette for containing said ink, said ink cassette being provided with a portion for preventing erroneous mounting; and an adapter having a receptor for detachably receiving said ink cassette and an information medium for storing information relating to said ink, said information being transmitted to said ink jet recording apparatus when said ink cartridge is mounted therein, said receptor having a portion corresponding to said portion for preventing erroneous mounting;

a recovery system for maintaining and recovering ink ejection from said recording head;

a receptor to which said ink cartridge is detachably mountable;

wherein said receptor is provided with a contact for electrically contacting said information medium to read said information, wherein said ink cartridge is detachably mountable to said ink jet apparatus.

8. An apparatus according to claim 7, further comprising drive control means for driving the recording head in accordance with the information read.

9. An apparatus according to claim 7, wherein said ink cartridge receptor is provided with a guiding member contactable with a projection formed on a side wall of a cassette including the ink container and an ink absorbing material, the projection being effective to facilitate mounting and dismounting of the cassette relative to the ink cartridge and also effective to limit an insertion position relative to said ink jet recording apparatus.

10. An apparatus according to claim 7, wherein the recording head is provided with an electrothermal transducer for producing thermal energy to produce a bubble to eject the ink.

11. An apparatus according to claim 7, wherein said ink cassette has an integral ink absorbing material for accommodating residual ink ejected to maintain and recover ink ejection from said recording head, said absorbing material being mounted to said adapter together with said ink cassette.

12. An apparatus according to claim 11, wherein said adapter has a partition member between said ink cassette and a portion for accommodating said ink absorbing material.

13. An apparatus according to claim 7, wherein said ink cartridge is electrically connected with pins to permit information transmission.

* * * * *